United States Patent [19]

Carlomagno

[11] Patent Number: 4,921,520

[45] Date of Patent: May 1, 1990

[54] PROCESS FOR APPLYING FORCES TO GLASS SHEETS, IN PARTICULAR AT A HIGH TEMPERATURE

[76] Inventor: Giovanni M. Carlomagno, Via Cintia, 38, Naples, Italy

[21] Appl. No.: 149,400

[22] Filed: Jan. 28, 1988

[30] Foreign Application Priority Data

Feb. 3, 1987 [IT] Italy .............................. 40404 A/87

[51] Int. Cl.⁵ .......................................... C03B 25/035
[52] U.S. Cl. ........................................ 65/111; 65/104; 65/119; 65/273; 65/182.3; 294/64.2; 294/64.3
[58] Field of Search ................. 65/104, 106, 111, 119, 65/273, 182.2; 294/64.2, 64.3

[56] References Cited

U.S. PATENT DOCUMENTS

| | | | |
|---|---|---|---|
| 3,300,290 | 1/1967 | Misson | 65/182.2 X |
| 3,332,761 | 7/1967 | Fredley et al. | 65/119 X |
| 3,523,706 | 8/1970 | Logue | 294/64.3 |
| 3,880,297 | 4/1975 | Martin | 294/64.3 X |
| 3,993,301 | 11/1976 | Vits | 294/64.3 X |

Primary Examiner—Arthur Kellogg
Attorney, Agent, or Firm—Neuman, Williams, Anderson & Olson

[57] ABSTRACT

The present invention relates to a process and a device for applying tensile forces, with no contact with solid walls, to glass sheets, in particular at high temperatures, wherein a gas or vapor is blown between the glass sheet and a wall closely approached, and parallel, to said glass sheet. Between the glass sheet and said wall a gas cushion is established, in that the sections through which the gas flows inside the air gap between the glass sheet and the wall increase on the average in the direction of streaming of the gas, so as to allow the gas speed to decrease, and a recovery in gas pressure to consequently take place. Several forms of practical embodiment of the device are disclosed.

7 Claims, 2 Drawing Sheets

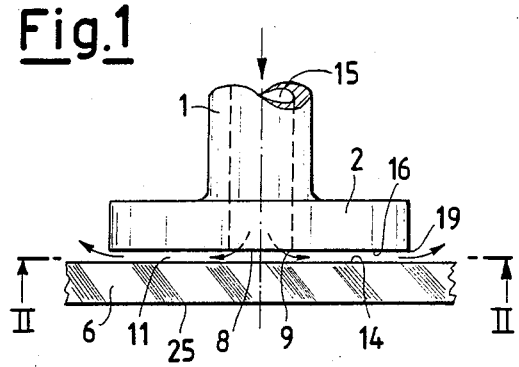
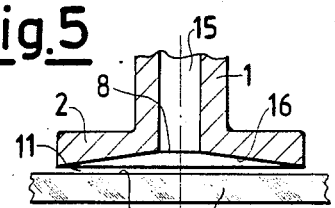
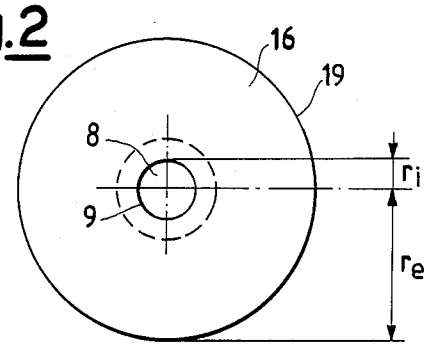
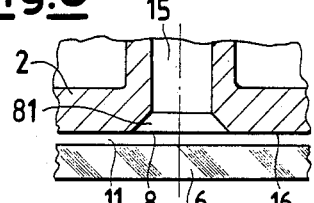
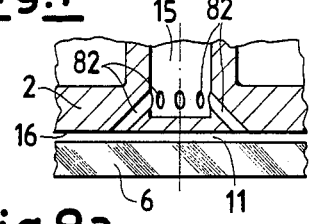
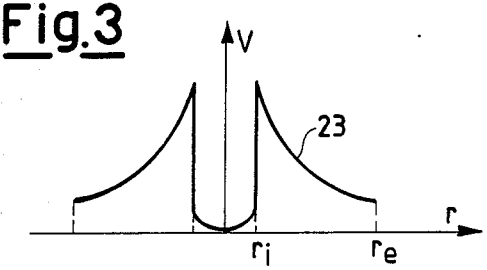
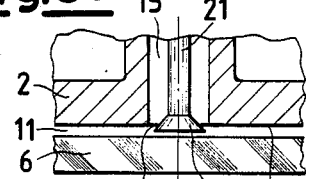
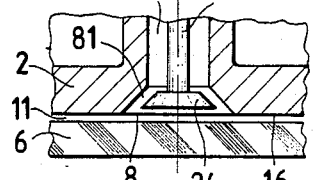
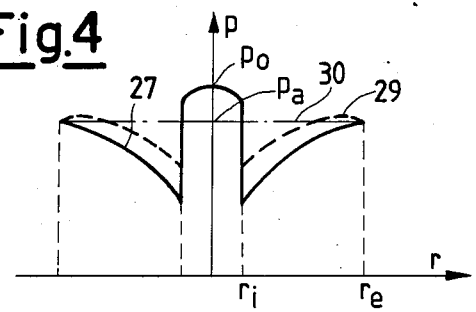
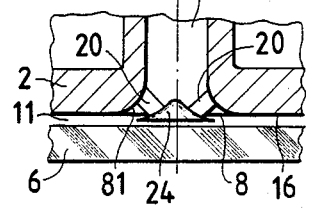

PROCESS FOR APPLYING FORCES TO GLASS SHEETS, IN PARTICULAR AT A HIGH TEMPERATURE

The present invention is concerned with a process, and the related device, for applying tensile forces, without any contact with solid walls, to glass sheets, in particular at a high temperature, in the operations of processing of the same glass sheets, and, more specifically, in the steps of cutting, grinding, transfer, heating, cooling, bending at a high temperature, and tempering.

The process and the related device can be applied, in particular, in the manufacturing of glass sheets for vehicles in general, or, specifically, of cars windows, of either tempered or laminated type.

These glass sheets must be generally manufactured with a high accuracy, both as regards their end geometry (wherein very narrow tolerances are allowed), and as regards the absence of optical distorsions or of any kinds of scratches. The absence of scratches is very important not only in the glass sheets, but also in any layers bonded to them such as metal coatings, silk-printed patterns of heated backlights, black or coloured stripes, trademarks, and so forth.

The dimensional accuracy and the absence of distorsions and/or scratches in the glass sheets require that the glass sheets are treated with great care during the processing steps, above all at high temperatures, when the glass is in a more easily deformable condition, because of the decrease in its viscosity.

The thinner the glass sheet, the greater the possibility for it to be deformed. In fact, the resistance of the glass sheet to the deformations deriving from bending or twisting loads (which are the prevailing loads) is approximately proportional to the third power of its thickness. Car manufacturers have recently increased the demand for thinner and thinner glass sheets, so that the manufacturers of these latter had to tackle the problem of their high deformability at a high temperature.

Every time the glass sheet comes into contact with solid walls (such as the clamps of the vertical furnaces, the conveyor rolls of horizontal furnaces, the forming ring and/or mould, the vacuum-sucking holder plates), both deformations localized in the contact points, and/or abrasions of the deposited layers possibly present on them are possible.

In glass industry, the system of supporting (and/or transferring) the glass sheet with a continuous gaseous bed - with air blown from the bottom - is well known and applied, wherein the glass sheet precisely lays (and/or is moved) on a continuous cushion of air blown through a solid wall, either porous, or with many holes. This system is characterized in that the air pressure between the above said wall and the glass sheet is always higher, on the average, than the atmospheric (ambient) pressure. Said overpressure (with the aid of possible side supports, also useful for moving the glass sheet) balances the weight of the glass sheet. Said system, on the other hand, does not make it possible to apply to the glass sheet, e.g., downwards-directed forces, or to support the same glass sheet from the top, i.e., with the wall being positioned opposite to the upper face (relatively to the gravity force) of the glass sheet. Therefore, it is not possible to easily transfer the glass sheet on a mould, or on a forming ring, or also pick it from conveyor rolls.

The supporting by means of a solid, either porous or perforated, wall, located in the upper side, is carried out by resorting to an air suction through the same wall, by means of the application of a vacuum above it, so as to provide a vacuum between the wall and the glass sheet, which balances the weight of this latter. Thus, the contact between the glass sheet and the holder plate results unavoidable, with all of the already mentioned drawbacks. In fact, it should be reminded that the layers deposited on the glass sheet are generally present on its upper face.

On the contrary, according to the present invention, the glass sheet can be also supported from atop, by blowing a gas between the glass sheet and the wall, instead of sucking ambient air, and hence with the presence, in this case too, of a gas cushion, which prevents the glass sheet-wall contact from taking place. This is possible in that, by using a special geometry of the wall through which the gas is blown, between said wall and the glass sheet a pressure is generated, which is, on the average, lower than ambient pressure, thus generating a tensile force which supports the glass sheet. On the same principle the possibility is based, of applying to the glass sheet a downwards-directed force, in case the wall is located under the same glass sheet.

The present invention consists in the process and in the related device for applying tensile forces, with no contact with solid walls, to glass sheets, in particular at a high temperature, characterized in that a gas is blown between the glass sheet and a wall closely approached, and approximately parallel, to it, in such a way that between the two a gas cushion is established, which generates a mutual coupling force. By "gas", also a vapour at a relatively high temperature is meant. By "mutual coupling force", it is understood that the force, if applied by the device to the glass sheet, is oriented from the glass sheet towards the same device (i.e., it is a tensile force applied to the glass sheet); the force applied by the glass sheet to the device is therefore oriented from the device towards the glass sheet. The two forces, of action and reaction, are therefore oriented in the directions which tend to couple the glass sheet and the device.

In case the wall is located above (relatively to the gravity force) the glass sheet, in the gas cushion provided between the two a pressure is established, which is on the average lower than the ambient pressure, which makes it possible for the glass sheet to be supported.

By "pressure on the average lower than ambient pressure", it is meant that the pressure integral extended to the surface area between the wall and the glass sheet (including the gas feed bore) is smaller than the product of said surface area by the ambient pressure. Under conditions of weight force balancing, the difference between these two amounts equals the same weight force. If, by starting from these conditions, the wall is shifted upwards, the gas cushion reaches a pressure level which is lower than the previous one, and therefore applies to the glass sheet a larger tensile force.

If, on the contrary, the wall is horizontal, and is located under the glass sheet, inside the gas cushion a pressure is established which, on the average, is higher than the ambient pressure and balances the sheet weight. However, contrarily to what happens in case of the continuous air cushion, with the present process a coupling force exists in this case too, because, if the wall is pulled downwards, the gas cushion reaches a lower pressure, and applies, in its turn, a tensile force to the glass sheet.

In other terms, in both the above said cases, the gas cushion is not only capable of supporting the glass sheet, but also of pulling it in a direction perpendicular to the surface of the same glass sheet. The tensile force is in fact always perpendicular to the glass sheet.

The objects, advantages and characteristics of the present invention will furthermore result from the following disclosure, relating to forms of practical embodiment thereof which are selected for exemplifying purposes only, with particular reference to the hereto attached drawing tables, wherein:

FIG. 1 shows the device, in its simplest form of practical embodiment, in the nearby of the glass sheet.

FIG. 2 shows the view of the device along the path II—II of FIG. 1.

FIG. 3 is a chart qualitatively showing the behaviour of the gas speed V inside the air gap 11 between the device and the glass sheet.

FIG. 4 is a chart qualitatively showing the behaviour of the absolute pressure p inside said air gap 11 and under the glass sheet.

FIG. 5 shows a sectional view of a form of practical embodiment of the device, wherein the lower face 16 of the flange 2 is not parallel to the glass sheet.

FIG. 6 shows a sectional view of a form of practical embodiment of the geometry of the gas feed bore.

FIG. 7 shows a sectional view of a form of practical embodiment of the gas feed to the air gap 11, carried out by means of a plurality of gas feed channels 82.

FIGS. 8a, 8b and 8c show sectional views of further forms of practical embodiment of the geometry of the bore 8, characterized by the presence of the gas diverting baffle 24.

Figure 9:
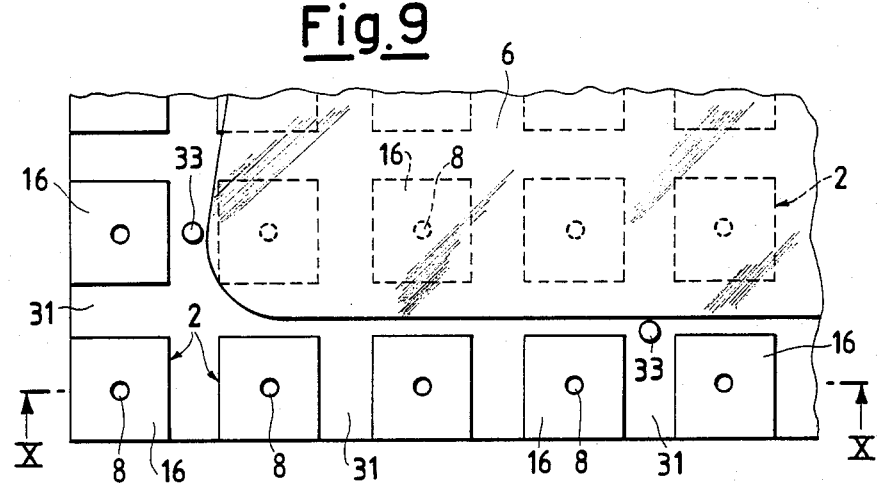

FIG. 9 shows a plurality of devices accomplished on a plate, some of which act simultaneously on a glass sheet.

Figure 10:
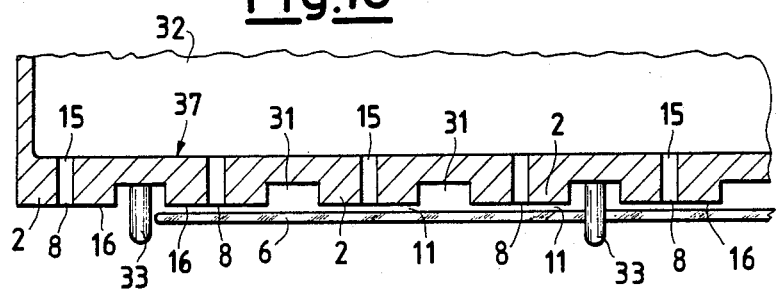

FIG. 10 shows the sectional view along path X—X of FIG. 9.

Figure 11:
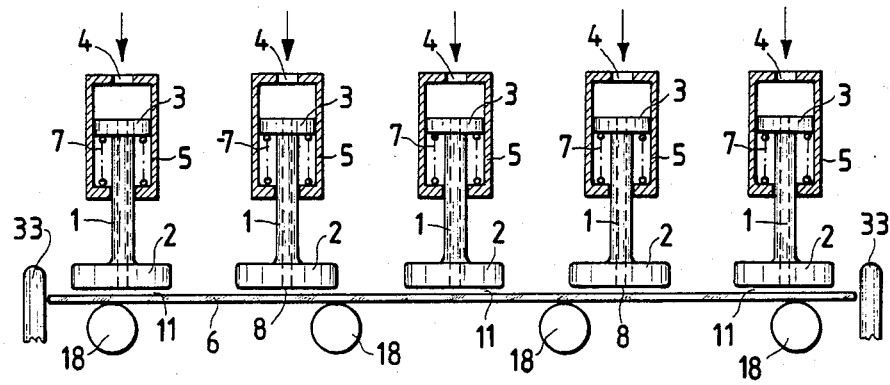

FIG. 11 shows a plurality of devices, which make it possible the glass sheet to be picked from conveyor rolls, and to be bent.

With particular reference to such Figures:

FIGS. 1 and 2 show the device of the invention, in its simplest form of practical embodiment, wherein the wall is constituted by a flat circular flange 2, provided with a bore 8 located in the nearby of its centre, through which a gas is blown. The gas is fed through the channel 15 provided inside the stem 1, more or less rigidly connected with the flange 2, and whose outer diameter can be larger than, smaller than, or equal to, the diameter of the flange 2. If the pressure $p_o$ of the gas inside the channel 15 is high enough, and the distance between the flange 2 and the glass sheet 6 is short enough, the weight of the glass sheet 6 can be balanced by the depressure (pressure lower than ambient pressure) which is generated inside the air gap 11 between the glass sheet and the flange. In other terms, the flange pulls the glass sheet.

The reason why the process is possible is the following.

In as much as the air gap 11 has a very small thickness (which experimentally results to be of the order of a few tenths of a millimeter), the gas stream reaches a high speed in the nearby of the inner edge 9 (located at the distance $r_i$ from the axis of the bore 8) of the flange 2. The arrows inside the air gap show the direction of gas motion. The curve 23 of the chart of FIG. 3 (which qualitatively describes the behaviour of the gas speed V as a function of the distance r from the axis of the bore 8) shows that, as the gas moves from the inner edge 9 towards the outer edge 19 (placed at the distance $r_e$ from the axis of the bore 8) of the flange 2, the speed of the same gas decreases, because the surface area of the section between the wall and the glass sheet, through which it flows, progressively increases. Therefore, if the pressure losses of the gas inside the air gap are smaller than the pressure recovery due to the decrease in its speed, in as much as at the outer edge 19 the gas practically reaches the ambient pressure, the same gas inside the air gap 11 is at a pressure which, on the average, is lower than ambient pressure. This can be observed from the solid-line curve 27 of the chart of FIG. 4, which qualitatively shows the behaviours of the pressure p of the gas as a function of the radial position r. FIG. 4 furthermore shows: the behaviour of pressure inside the air gap in case higher pressure losses occur (the dashed-line curve 29); the value of the ambient pressure $p_a$ (dashed/dotted-line curve 30) acting on lower face 25 of the glass sheet; and the value $p_o$ of the gas feed pressure which is reached in correspondence of the axis of the bore 8, wherein the gas speed is practically zero. The distribution$ f the pressure vaLue on the two faces of the glass sheet (curves 27 and 30) show that, even if in the nearby of the bore 8 a force exists, which pushes the glass sheet downwards (p larger than $p_a$), the difference between the ambient pressure and the pressure inside the air gap can balance both this force and the weight of the glass sheet; thus, a coupling force exists hence, which tends to couple the device and the glass sheet. This is true also in case of a curve of the type indicated by the reference numeral 29, provided that the integral of the pressure, extended to the whole surface of the glass sheet, generates a resulting force directed upwards, i.e., the pressure between the glass sheet and the device is on the average lower than ambient pressure.

The phenomenology is slightly more complex if the radial symmetry is absent (i.e., the flange 2 and/or the bore 8 are not circular), or the motion of the gas is supersonic, with the possible presence of shock waves. However, it was found that, if the geometry of the device is not very different from that described, and if the gas feed pressure $p_o$ is high enough, the resulting effect is practically the same.

Furthermore, it should be observed that the coupling force is generally stable because small increases in the distance between the surfaces 16 and 14 (e.g., downwards movements of the glass sheet) increase the depressure level inside the air gap (i.e., the force acting on the glass sheet tends to bring it back upwards) and vice-versa. The stability is mainly bound to the pressure losses occurring in the motion of the gas inside the air gap 11.

The coupling force exists also if the device is located under the glass sheet in the meaning that, differently from the case of the continuous air cushion already known from the prior art, when the device is moved downwards, the glass sheet accelerates with an acceleration which is higher than that of gravity. In this case, in fact, if the glass sheet and the device are stationary, inside the air gap 11 a pressure is established, which on the average is higher than the ambient pressure necessary to balance the weight of the glass sheet. However, if the device is pulled downwards, it applies, in its turn, a downwards-directed tensile force to the glass sheet, because, under such conditions, inside the air gap 11 a pressure is established, which is considerably lower than ambient pressure. This is true for a constrained sheet too, as well as for a glass sheet at a high temperature, when it is not rigid, but deformable.

The coupling force does not exist if the distance between the surfaces 14 and 16 of FIG. 1 is long. In that case, the gas jet pushes back the glass sheet. The coupling takes place only when such distance is shorter than a certain value which is, above all, a function of the geometry of the device.

FIG. 5 shows a form of practical embodiment of the device of FIG. 1, characterized in that the surface 16 of the flange 2, although is nearly flat, is not perfectly parallel to the upper surface 14 of the glass sheet, but has a slightly cone-frustum shape. In fact, it can be advantageous to give the whole surface 16, or a portion thereof, a slightly cone-frustum shape, or, generally, a non-flat shape (i.e., with a prefixed outline), both in order to optimize the pressure distribution on the glass sheet, and to decrease the pressure losses. The process is characterized in fact in that the sections through which the gas flows inside the air gap 11 have to increase, on the average, in the direction of movement, i.e., in such a way as to make it possible the gas speed to decrease and the consequent recovery of pressure to be achieved, which generates the coupling force between the device and the glass sheet. Therefore, also non-circular geometries of the bore and/or of the flange, are possible; in particular, the flange and/or the bore can have a polygonal or elliptical shape.

FIG. 6 shows a form of practical embodiment of the geometry of the gas feed bore 8, which is characterized by the pesence of the cone-frustum chamfer 81, which makes it possible the gas to better enter the air gap 11. Other shapes, not shown in FIG. 6, are possible for the chamfer, in order to improve such gas entering; an example thereof is the rounded chamfer of FIG. 8c.

FIG. 7 shows a form of practical embodiment of the gas feed to the air gap 11 characterized by the presence of a plurality of gas feed channels 82 which branch off the main channel 15. This form of practical embodiment, like those relating to the following FIGS. 8a, 8b and 8c, shows the advantage that the gas is better distributed inside the air gap 11. The channels 82 can be inclined relatively to the axis of the channel 15, as shown in FIG. 7, or they can be parallel, or even skew, to it.

When the device is being approached towards the glass sheet, i.e., before the motion already disclosed inside the air gap 11, and the consequent coupling force, are generated, from the gas feed bore 8 a gas jet escapes, which impinges perpendicularly onto the glass sheet. This fact can be undesired both because—if the bore 8 has a relatively large diameter—the gas flow rate is large, and because—if the glass sheet is hot (as it occurs when leaving a furnace)—the gas jet can deform it, and/or intensely cool it.

FIGS. 8a, 8b and 8c show that these drawbacks can be overcome by placing in the nearby of the gas feed bore either chamfered or not), a gas diverting baffle 24, in order to limit the gas flow rate, and/or generate an annular stream, which does not directly impinge onto the glass sheet, but tends, already since the beginning, to lap the surface 16. The diverting baffle 24 can be located both lined-up with, and above (FIG. 8b), or under (FIGS. 8a and 8c) the gas feed bore 8, and can be supported by the support 21 of FIGS. 8a and 8b, or by the spokes 20 of FIG. 8c. The baffle 24 can be shifted, e.g., by moving the support 21, and such possibility can be used in order to change the coupling force between the device and the glass sheet, in particular during the glass sheet release step. A correct fluiddynamic design of the baffle 24 can decrease the force which pushes downwards the glass sheet in correspondence of the bore 8 (see FIG. 4), or it can even generate in this region a pressure which is lower than the ambient pressure.

According to a different form of practical embodiment not shown in the Figures, the baffle 24 can extend to the whole cross-section area of the bore 8, provided that it is wholly or partially realized from a porous material, which allows the gas to flow through.

Practical tests demonstrated that a structural solution accomplished according to the type shown in FIG. 8b yields particularly advantageous results, and, above all, that it causes a pressure lower than the ambient pressure to be established in the area under the diverting baffle 24, besides limiting the gas flow rate before the coupling force is established.

An example of practical embodiment of the device of FIGS. 1 and 2, with the gas feed bore 8 being accomplished according to the form of practical embodiment shown in FIG. 8b showed the following geometry:

outer radius $r_e$ of the flange 2: 44 mm;

radius of the cone-frustum shaped chamfer 81 on the surface 16: 29.5 mm;

longer diameter of the diverting blaffle 24: 58.6 mm;

angle between the cone-frustum shaped chamfer 81 and the surface 16 of the flange: 29°;

angle of the diverting baffle 24 relatively to its lower face: 24°.

The diverting baffle 24 can be mounted both with its lower face being lined-up with the surface 16, and slightly above, or slightly under it, by a few tenth of a millimetre.

When the lower face of the diverting baffle 24 is placed at 0.1 mm below the surface 16, the device is capable of safely supporting, from atop, a circular glass sheet having a diameter of 100 mm and a weight of 90 g, with a flow rate of room-temperature air slightly larger than 4 m$^3$/hour, fed under a pressure $p_o$ of approximately 0.1 atm gauge.

Under these conditions, the thickness of the air gap 11 results to be of approximately 0.25 mm.

In case of an air feed pressure twice as large as above indicated, the glass sheet is still supported by the device (with a greater reliability), and the thickness of the air gap 11 results of approximately 0.20 mm.

For still higher air supply pressures, the reliability of glass sheet supporting furthermore increases (in the meaning that random forces which may add to the weight force will not cause the glass sheet to move away from the device in the vertical direction) and the thickness of the air gap slightly decreases.

Under all the above reported operating conditions, the region of the air gap 11 lying under the diverting baffle 24 is actually at a pressure lower than ambient pressure (depressure). Such depressure the higher, the higher the gas supply pressure $p_o$.

FIG. 9 shows a plurality of devices accomplished on a plate, some of which act on a shaped glass sheet. The whole of FIG. 9 is shown from the bottom, and FIG. 10 is a sectional view of the plate according to path X—X of FIG. 9. In this example of practical embodiment, the devices 2 are provided on the plate 37, upstream which a gas supply chamber 32 is present (this latter chamber can be replaced by a set of pipes, not shown in the figures, which feed the channels 15). FIG. 9 shows that, in this case, the devices 2 have a square shape, and between them the channels for blown gas venting 31 are provided. The number of the devices is larger than the number of devices which are necessary for supporting the glass sheet shown in FIG. 9, to make it possible the equipment to be used also in case of larger glass sheets. The coupling force is only accomplished when the glass sheet is very close to the plate, and the gas is blown through the feed bores 8, which can also be fed in an uneven way. The release of the glass sheet takes place by decreasing the gas flow rate through the bores 8, or, in particular, by reducing it to zero. If the glass sheet is hot, the blown gas can be heated in its turn to a suitable temperature, in order to prevent it from cooling.

In the above descriptions, the device, or the devices—in case more then one thereof are present—have always been shown in a horizontal position, and located above the glass sheet. They, however, have not to be considered as mandatorily located in such a position, and, in particular, with their surface 16 being horizontal, in that this latter can be anyway inclined and, as it is seen in the following, can be provided with motion. However, in case of a position even slightly inclined relatively to the horizontal, the device balances, with its tensile force, only the component of the weight force which is perpendicular to the face 16, because in the tangential direction (parallel to said face), the gas cushion is unable to exert any forces, but the very weak friction force. In order to balance the tangential component, other forces are therefore necessary, which, e.g., in case of FIGS. 9 and 10, are applied by the stop elements 33 whose purpose is of not allowing the glass sheet to slip laterally. The stop elements 33, or similar apparatuses, can also be used, if they are movable in a direction parallel to that of the face 16, in order to supply the glass sheet with motion.

In FIG. 9, one can observe that the gas cushion between the wall and the glass sheet is not continuous; on the contrary, the arrangement and the dimensions of the venting channels 31 shall be such as to generate a gas pressure inside them, which is very close to ambient pressure.

FIG. 11 shows an example of practical embodiment of a set of devices which make it possible a hot glass sheet to be picked from conveyor rolls, it to be bent and it to be possibly cooled. The glass sheet 6, coming from an oven, not shown in the Figure, progresses on the rolls 18, which revolve about their axis, until it comes to the position shown in FIG. 11, for which position the rolls stop. Nearly simultaneously, from the bottom the stop elements 33 (which, in a different form of practical embodiment, not shown, can come as well from the top, or from the sides of the glass sheet) move upwards, and the gas (in this case, hot gas) delivery to the various devices, through the bores 4 of the pneumatic cylinders 5, is started. The gas applies a thrust to the pistons 3 which, by means of the stems 1, lower the flanges 2 until these latter come close to the glass sheet. In the mean time, the gas, by outflowing through the bores 8 (in that the pistons 3, the stems 1 and the flanges 2 are so bored, as to allow the gas to reach the air gap 11), accomplishes the mutual coupling of the glass sheet and the devices. The springs 7 contained inside the cylinders 5 serve to initially keep the flanges 2 in a lifted position, not shown in Figure, to make it possible the glass sheet to run through, before the coupling takes place. The sinking of the flanges 2 can anyway be controlled, according to a different form of practical embodiment not shown in figure, by adequate mechanisms. The springs 7 can be replaced as well by gas cushions, or by other mechanisms, which also are not shown in figure. According to a different practical embodiment, not shown in figure, the coupling between the glass sheet and the devices can be accomplished, or made easier, by analogous devices, or by gas jets, coming from down, through the free spaces between the rolls, which urge the glass sheet upwards. Once that the glass sheet-devices coupling force is generated, the glass sheet can be lifted, by means of mechanisms not shown in figure, making the flanges 2 uniformly translate upwards; furthermore, by providing said flanges with translational and revolutionary movements which are different from one another, it is possible to bend the glass sheet above the conveyor rolls until it reaches a desired shape which is different from the nearly flat initial shape. Now, it is possible as well, whenever necessary, to blow gas at a lower temperature, such to partially cool down the glass sheet and consolidate its shape to a larger or smaller extent, before releasing it. As an alternative, or simultaneously, the devices can move the glass sheet to a tempering area.

According to a different form of practical embodiment not shown in figure, the devices of the type as shown in FIG. 11 can be located under, rather than above, the glass sheet, and act through the free spaces between the rollers. In such case, the coupling forces between the glass sheet and the devices make it possible the glass sheet to be bent to a desired shape, which is not possible in the support system by the continuous air cushion with air blown from down upwards.

Although, due to descriptive reasons, the present invention has been grounded on what is hereinabove disclosed and illustrated for merely exemplifying purposes, with particular reference to the hereto attached drawing tables, many modifications and changes can be supplied when practicing the invention. Such modifications and changes shall anyway be considered as grounded on the appended claims.

I claim:

1. A method of handling a sheet without physical contact therewith, using at least one device for handling having a first surface extending to a perimeter and a bore directed therethrough and intersecting the first surface, each device being bounded along at least part of its periphery by a space disposed at ambient pressure, the sheet having at least a second, lower surface, said method comprising the steps of:
    (a) disposing the sheet approximate of and above each handling device so that the first and second surfaces oppose each other and a gap is formed therebetween;
    (b) directing upward a stream of fluid under pressure through the bore of each handling device and towards the second surface of the sheet to push the sheet upwards;
    (c) directing the pressurized fluid away from the fluid stream of each handling device as an outward fluid flow through each gap formed by each handling device and the sheet, towards its perimeter;
    (d) permitting each outward fluid flow to escape from its gap into its bounded space; and
    (e) setting the pressure of each fluid stream sufficiently greater than the ambient pressure and the width of each gap sufficiently small such that the pressure and velocity of each fluid flow as it initially enters each gap respectively decreases and increases and, thereafter, increases and decreases as a function of the distances of each fluid flow from its fluid stream, whereby a pressure negative with respect to the ambient pressure is created within the gap due to a venturi effect caused by the relatively high velocity of the fluid flow through the gap so that the integral of the pressure over the whole of the second surface develops a net attracting force directing the sheet towards the first surface.

2. The method according to claim 1, characterized in that the handling device is located under the sheet and supports it, even partially, inside the fluid cushion between the handling device and the sheet, a pressure is established, which, on the average, is higher than ambient pressure, whereby when the handling device is moved downwards along a trajectory which is perpendicular to the sheet, inside the fluid cushion a pressure is established, which, on the average, is lower than ambient pressure, and a tensile force, applied to the sheet, is generated.

3. The method according to claim 2, characterized in that if the tensile force is used in order to support the sheet and/or in order to transfer it, said support and said transfer action are made easier by the presence of mechanical devices which are in contact with the sheet.

4. The method of handling as claimed in claim 1, wherein the pressure of each fluid stream is set at approximately 0.2 atm gauge.

5. The method of handling as claimed in claim 1, wherein the pressure of each fluid stream is set in the range of 0.1 to 0.2 atm gauge.

6. The method of handling as claimed in claim 5, wherein the selected gap width is set in the range of 0.25 mm to 0.20 mm.

7. The method of handling as claim in claim 1, where in step (c), the fluid stream is prevented from directly striking the second surface and is deflected by a third surface displaced from the second surface and into the gap.

* * * * *